United States Patent [19]

Piber

[11] Patent Number: 4,665,290

[45] Date of Patent: May 12, 1987

[54] TRIGGER OPERATED PORTABLE ELECTRIC TOOL SWITCH

[75] Inventor: Earl T. Piber, Oconomowoc, Wis.

[73] Assignee: Eaton Corporation, Cleveland, Ohio

[21] Appl. No.: 781,625

[22] Filed: Sep. 30, 1985

[51] Int. Cl.[4] .......... H02B 1/08

[52] U.S. Cl. .......... 200/303; 200/157

[58] Field of Search .......... 200/295, 303, 157

[56] References Cited

U.S. PATENT DOCUMENTS

| | | | |
|---|---|---|---|
| 2,588,565 | 3/1952 | Pealer | 200/318 |
| 3,260,827 | 7/1966 | Frenzel | 200/157 |
| 3,536,973 | 10/1970 | Matthews et al. | 200/157 |
| 3,775,576 | 11/1973 | Brown | 200/157 |
| 3,886,340 | 5/1975 | Bittel | 200/157 |
| 4,241,298 | 12/1980 | Trammell, Jr. et al. | 200/157 |
| 4,572,997 | 2/1986 | Yamanobe et al. | 200/157 |

FOREIGN PATENT DOCUMENTS

| | | | |
|---|---|---|---|
| 48124 | 3/1982 | European Pat. Off. | 200/157 |

*Primary Examiner*—Stephen Marcus
*Assistant Examiner*—Renee S. Luebke
*Attorney, Agent, or Firm*—D. A. Rowe; L. G. Vande Zande

[57] ABSTRACT

A pair of insulating base halves (26,28) are adapted for mutual engagement along respective open sides, one base half (26) containing stationary contacts (30,32,34) and an electrical bussing element (30) structurally interlocked with that base half upright against an interior wall and the other base half containing a speed control circuit board (40) disposed in an upright position along an opposite interior wall and electrical connectors (56,58) biased into electrical engagement with the circuit board and forming push-in lead connectors with the stationary contacts and bussing element, a movable contact carrier (38) disposed between the base halves for sliding movement and having a movable contactor (64) engaging the stationary contacts and a wiping contact (66) engaging variable resistance (44,46) elements on the printed circuit board, the two base halves being interlocked (**26*k*,28*e*) together along a lower edge and retained together along an upper edge by inserting them into a hollow housing (2) containing a depressible trigger operator (4,18) the insertion effecting a driving connection (18*d*,38*k*) between the movable contact carrier and an internal member (18) of the trigger operator, the internal member having a shaft (18*a*) projecting through an opening (2*b*) in an end wall of the housing which has a seal retaining cage (2*c*) formed thereon around the opening (26) the internal member being retractible to position the end of the shaft (18*a*) flush with the end wall for permitting a seal (22) and seal retaining cap (24) to be inserted to said cage, and an external trigger operator member (4) affixed to the end of the shaft, the external member having an interlocking structure (4*d*) formed therein for cooperation with a reversing switch lever (14) which overlies the external trigger operator member and has a depending projection (14*d*) engaging the interlocking structure (4*d***) in a center position to prevent depression of the trigger.

7 Claims, 13 Drawing Figures

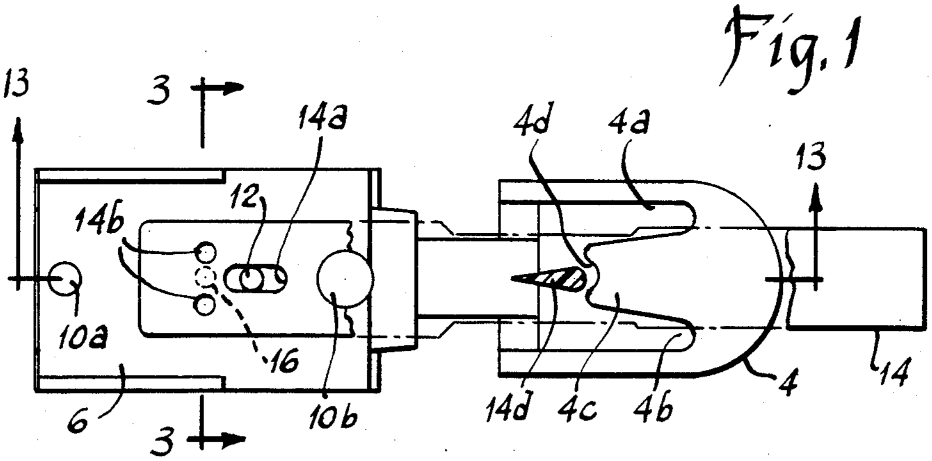
Fig. 1
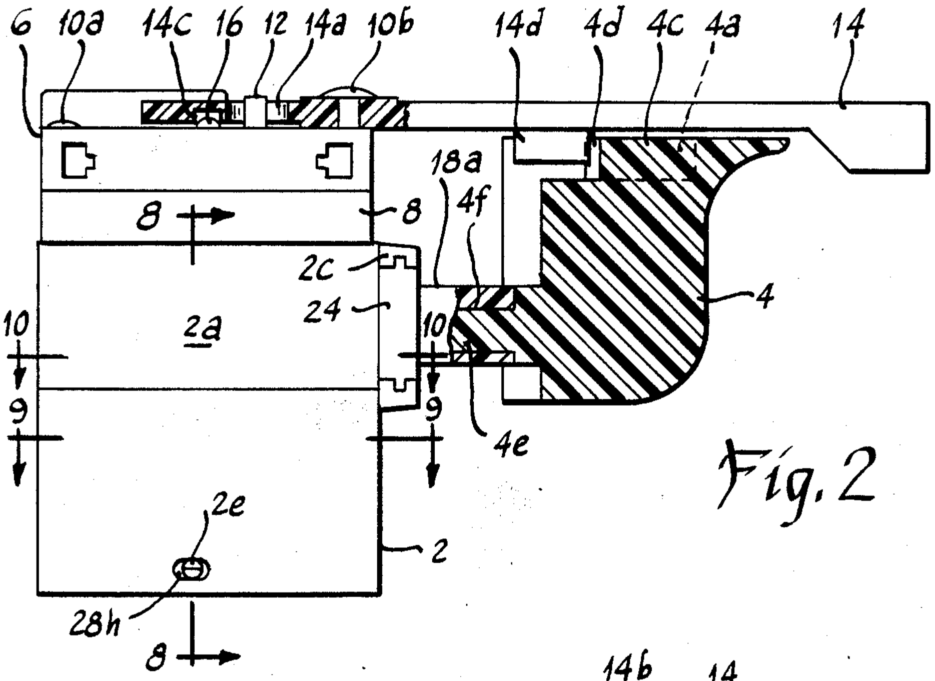
Fig. 2
Fig. 3
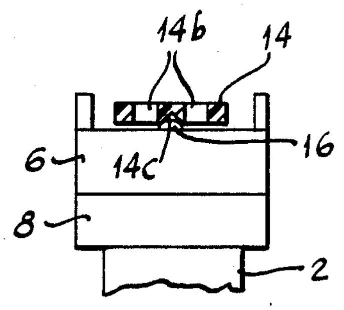

Fig. 10
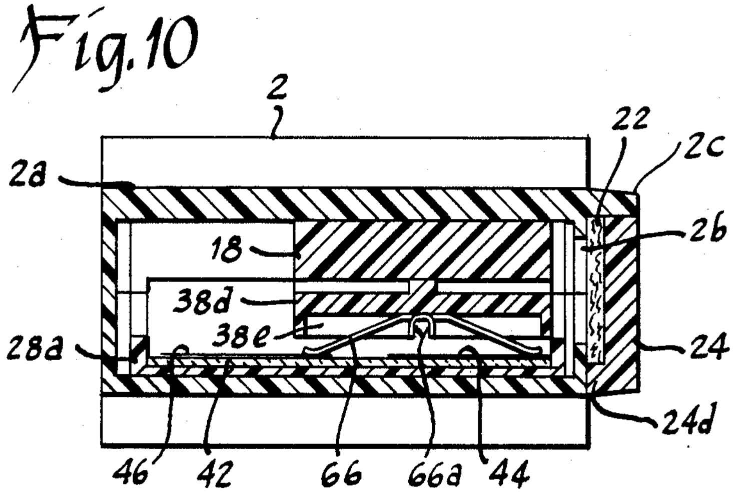
Fig. 11
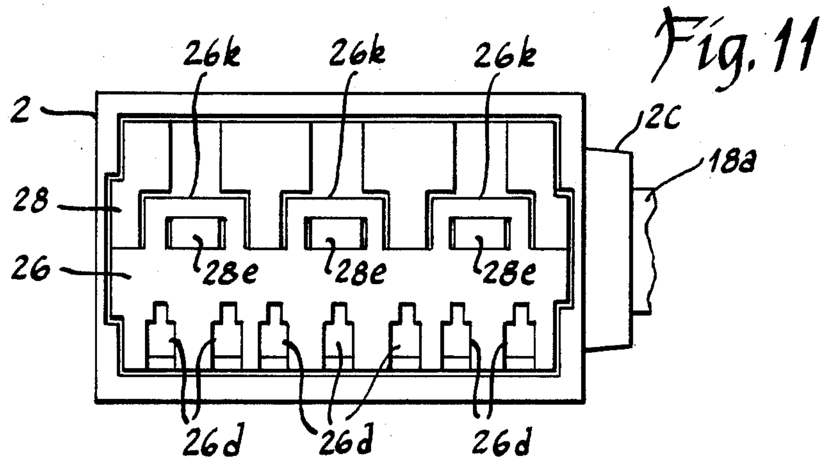
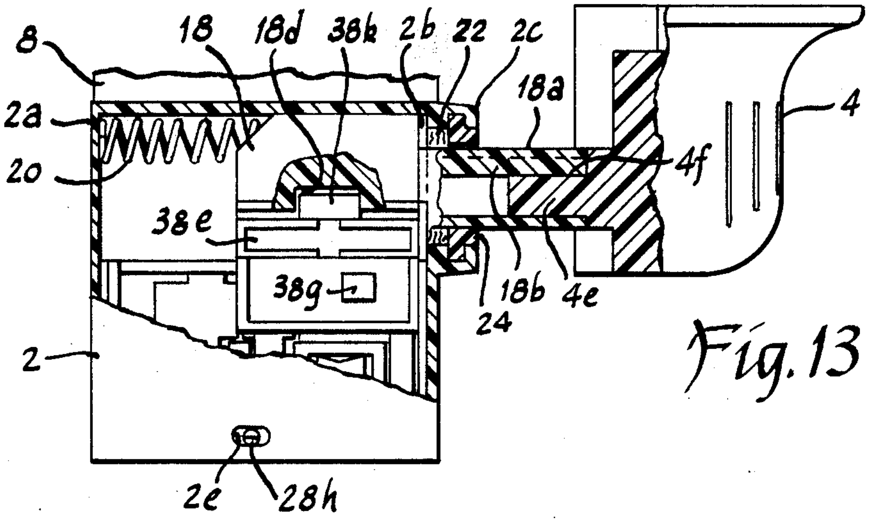
Fig. 13

TRIGGER OPERATED PORTABLE ELECTRIC TOOL SWITCH

BACKGROUND OF THE INVENTION

This invention relates to electric switches for controlling portable electric tools, the switch having a trigger operator which is adapted to be operated by the index finger of the user's hand which holds the tool. More specifically, the invention relates to switches of the aforementioned type which control the speed of the motor as a function of depression of the trigger and which have reversing and lock-off functions controlled by a lever in proximity to the trigger for similar operation by the index finger.

Switches of the aforementioned type incorporate a large number of operational functions within a package sufficiently small to fit within the handle of a portable tool. The operator members for controlling such functions are preferably located in an area to facilitate operation by the index finger and/or thumb of the user's hand. The environment in which such portable tools are utilized suggests that the switch be a well sealed device to prevent contaminants from getting into the area of the switching contacts. These and other requirements for portable tool controlling switches provide the manufacture of such switches with significant problems of utilization of space, compactness, dissipation of heat, and overall structural integrety of the design.

SUMMARY OF THE INVENTION

The trigger operated tool handle switch of this invention provides a particularly advantageous arrangement of parts to overcome the problems enumerated above. It comprises a box-like housing preferably molded of plastic insulating material open to a bottom side and having an opening in an end wall through which the trigger operator projects. A pair of insulating base halves receive stationary switch contacts and a speed control hybrid circuit board, respectively. A movable contact carrier having a movable contactor biased outwardly of one side and a variable resistor wiper on an opposite side is disposed between the base halves for sliding movement along the upper edges of the base halves. Electrical connectors are disposed between the base halves internally along mating lower edges to retain push-in wire leads firmly against terminal portions of the stationary contacts and to electrically connect the leads and contacts to respective connection pads on the speed control board. The subassembled base halves and respective elements contained thereby are inserted through the open bottom side of the housing, the latter serving to hold the base halves assembled firmly together. Interlocking formations are provided at the lower edges of the base halves to firmly hook the base halves together along that edge to provide additional strength for the assembly at the bottom of the housing where the housing walls are the weakest. The trigger operator comprises separate internal and external parts. A driving connection between the internal operator part and the contact carrier is effected upon insertion of the base halves into the housing. A shaft on the internal operator member projects through the opening in the housing end wall. The internal operator member is depressible to move the outer end of the shaft flush or internally of the exterior surface of the end wall to permit transverse insertion of a seal into a seal-retaining cage formed on the exterior of the housing end wall around the opening. Thereafter, a second, finger-engagable part of the trigger is attached to the shaft. The upper surface of the second part of the trigger is provided with a pair of recesses defining a central barrier, and the barrier is relieved at an end for engagement with a projection on a reversing switch lever overlying the trigger to prevent depression of the trigger when the lever is in a center position. The advantageous arrangement of the foregoing features in providing the improved compact switch of this invention will be more fully understood and appreciated from the following description and claims when read in conjunction with the accompanying drawings.

BRIEF DESCRIPTION OF THE DRAWINGS

FIG. 1 is a top view of the trigger operated portable electric tool switch of this invention showing a lock-off feature incorporated in the reversing switch lever operator and the depressible trigger operator for the switch;

FIG. 2 is a side elevation view, partly in section, of the switch shown in FIG. 1;

FIG. 3 is a fragmentary sectional view taken along the line 3—3 in FIG. 1 showing a detent structure for the lever operator of the reversing switch;

FIG. 10 is a longtitudinal cross-sectional view of the switch of this invention taken along the line 10—10 in FIG. 2;

FIG. 11 is a bottom plan view of the frame and left and right base halves of the switch of this invention;

FIG. 13 is a longitudinal sectional view of portions of the switch of this invention taken generally along the line 13—13 in FIG. 1.

DESCRIPTION OF THE PREFERRED EMBODIMENTS

Figure 4:
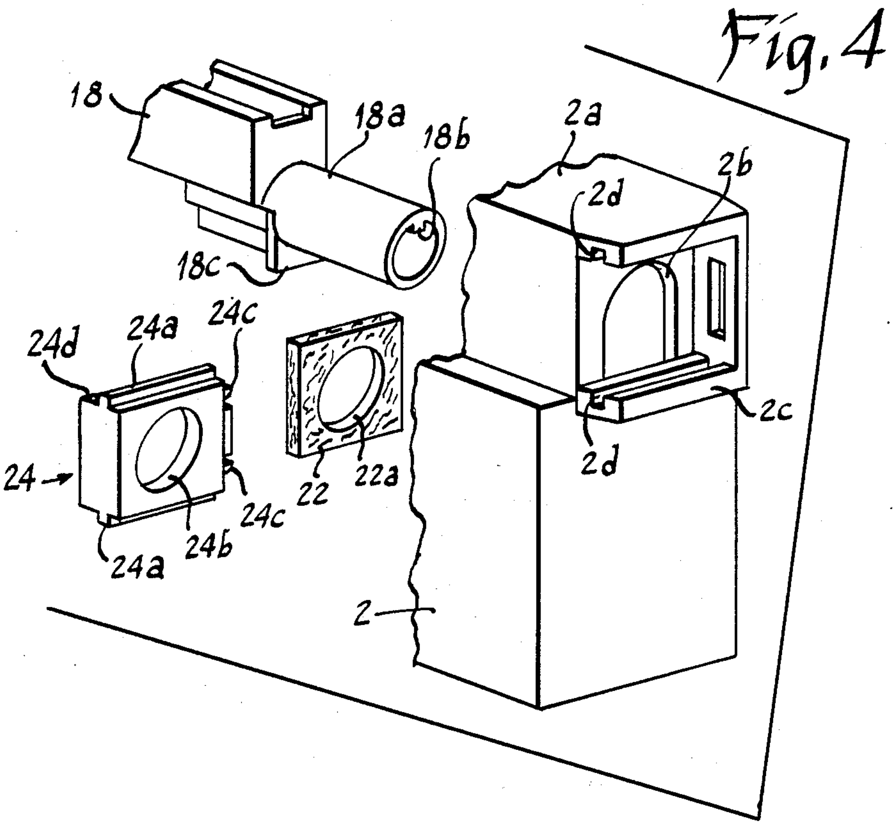
FIG. 4 is an exploded pictorial view of a fragmentary portion of the switch frame and associated members embodying a sealing structure for the trigger operator of the switch.

Referring to FIGS. 1-3 of the drawings, the trigger operated portable electric tool switch of this invention comprises a molded insulating frame 2 having a trigger operator 4 projecting from one end thereof. Trigger operator 4 is linearly depressible to the left as viewed in FIG. 2 for operation of the switch from an OFF to an ON condition and for increasing the speed of the motor controlled by the switch as a function of the amount of trigger operator depression. The switch further includes a reversing switch module 6 of well known construction and an electrically insulating spacer 8 mounted on the top surface of frame 2 by rivets 10*a* and 10*b*. Reversing switch module 6 has a slidable actuator 12 projecting upwardly through an opening in an upper surface of the switch module housing. An operating lever 14 for the reversing switch module 6 is pivotally mounted on rivet 10*b* at the upper surface of switch module 6. A forward portion of lever 14 which extends to the right of rivet 10*b* in FIGS. 1 and 2 overlies the upper surface of trigger operator 4. A rearward portion of lever 14 which extends to the left of rivet 10*b* in FIGS. 1 and 2 has a longitudinally extending slot 14*a* in which is disposed the upwardly projecting operator 12 of reversing switch module 6. Lever 14 is pivotally movable from side to side about rivet 10*b* transversly of trigger 4 to translate the operator 12 in opposite transverse directions by virtue of the driving connection between slot 14*a* and the operator 12. Lever 14 is also provided with a pair of circular openings 14*b* located immediately to the left of slot 14*a* which cooperate with a ball shaped projection 16 in the rotor of reversing switch module 6 to provide distinct positioning for lever 14 when pivoted to the right or left side of trigger operator 4. The underside of lever 14 in the area between openings 14*b* is provided with an inverted V-shaped recess 14*c* which overlies the ball shaped projection 16 to also provide a center position detent for the lever 14. A projection 14*d* depends from the under surface of lever 14 at the forward or right-hand side of rivet 10*b* to be received within slots 4*a* and 4*b* formed in the upper surface of trigger operator 4 when the lever is pivoted to the left or right side of the trigger, thereby to enable the trigger 4 to be depressed for actuating the switch to an ON condition. A central barrier 4*c* in trigger operator 4 separates the slots 4*a* and 4*b* and interferes with depending projection 14*d* when trigger operator 4 is depressed to prevent pivotal movement of lever 14 from one position to the other while the tool motor is running. The left-hand end portion of central barrier 4*c* as viewed in FIGS. 1 and 2 is relieved by the formation of a semicylindrical recess 4*d* which is shaped complementally to the right-hand end of depending projection 14*d*. When lever 14 is positioned intermediate its left or right positions to immediately overlie trigger operator 4, the right-hand end of depending projection 14*d* is engaged by cylindrical recess 14*d* upon initial depression of trigger operator 4 to prevent full switch actuating depression of the trigger operator. This construction provides an off-lock for the trigger operator without incorporating additional discrete parts to the switch assembly.

Figure 5:
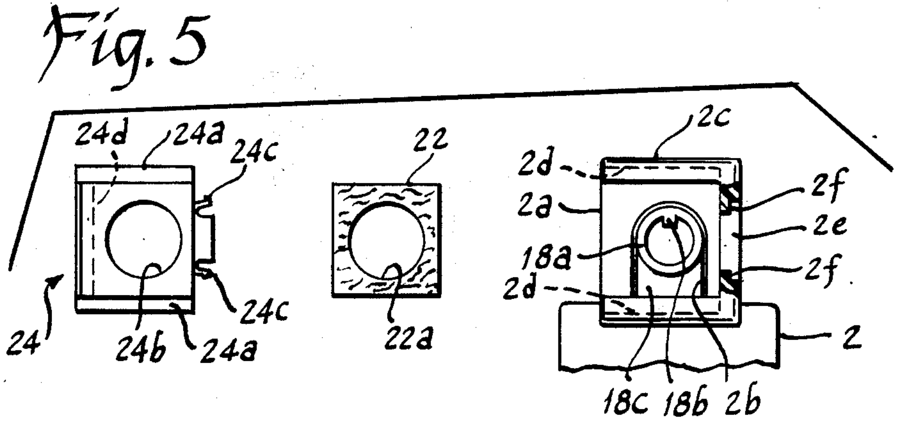
FIG. 5 is an exploded end elevational view of the members shown in FIG. 4.

Trigger operator 4 further comprises a separate trigger body member 18 as best seen in FIGS. 4 and 13. Trigger body member 18 is disposed within the narrower upper portion 2*a* of insulating frame 2 and has a shaft 18*a* extending from the right-hand end thereof to project through an opening 2*b* in the end wall of frame 2. Shaft 18*a* is hollow and has a key 18*b* formed along its interior surface. Trigger operator 4 has a short cylindrical post 4*e* having an axially extending keyway 4*f* adapted for reception in the end of trigger body shaft 18*a*. The upper portion of trigger body 18 is hollowed out and open to the top side thereof and receives a helical compression spring 20 (FIG. 13) which bears on an end wall of trigger body 18 and on an interior end wall of switch frame 2 to bias the trigger operator 4 to its extended position. As seen best in FIG. 4, the right-hand end of switch frame 2 is provided with a three-sided cage 2*c*, surrounding the opening 2*b* to define a recess in the end wall of frame 2. The upper and lower sides of cage 2*c* are provided with transversly extending grooves 2*d* open to the open side of the cage 2*c*. The closed side of cage 2*c* has a rectangular aperture 2*e* formed therein which, as shown best in FIG. 5, has stepped upper and lower edges 2*f*. Prior to attachment of trigger operator 4 to trigger body 18, the latter is depressed against the bias of spring 20 to its extreme left-hand position within frame 2. In this position, the end of shaft 18*a* is retracted to a position at least flush with the end wall of frame 2 in which opening 2*b* is formed. A rectangular seal 22 having a circular hole 22*a* therein formed complementally to the outside diameter of shaft 18*a* is inserted into the recess defined by cage 2*c* from the open side thereof. Seal 22 is preferably formed of a fibrous mat material such as felt or the like. With the shaft 18*a* still retracted, a cap 24 is also assembled to the cage 2*c*. Cap 24 has pairs of transversly extending ribs 24*a* which are slidably received within grooves 2*d* to guide and position cap 24 to the cage 2*c*. Cap 24 is provided with a circular opening 24*b* which is slightly larger in diameter than the outside diameter of shaft 18*a* to provide a clearance opening therefor. With reference to FIGS. 4 and 5, one edge of cap 24 is provided with a pair of resilient latch members 24*c* which project through opening 2*e* in the closed side of cage 2*c* and snap over the stepped upper and lower edges 2*f* of that opening to secure the cap 24 in place. A flange 24*d* formed on an edge of cap 24 opposite the edge on which hooks 24*c* are provided abuts the end wall of frame 2 to close off the remaining or fourth side of the cage 2*c*, thereby cooperating with the cage to fully retain the seal 22 within the recess provided by the cage. When cap 24 and seal 22 are so positioned, trigger body member 18 may be released whereby spring 20 biases the trigger body member to the right and shaft 18*a* projects outwardly of the frame 2 through opening 2*b*, the opening 22*a* in seal 22 and the opening 24*b* in cap 24. Subsequent to this assembly step, an adhesive is applied to the shaft 4*e* of trigger operator 4 and shaft 4*e* is inserted within the hollow projecting end of shaft 18*a* of trigger body 18 to permanently secure the two members together. Trigger body 18 is also provided with a depending flange 18*c* at the juncture of shaft 18*a* with the trigger body. Flange 18*c* is disposed slightly forwardly, or to the right of the end of trigger body 18 so that it is disposed within the opening 2*b* of frame 2 and presents a lower surface which is flush with the end wall of frame 2 to provide a firm support for the back side of seal 22 when the trigger operator is in its extended position.

Figure 7:
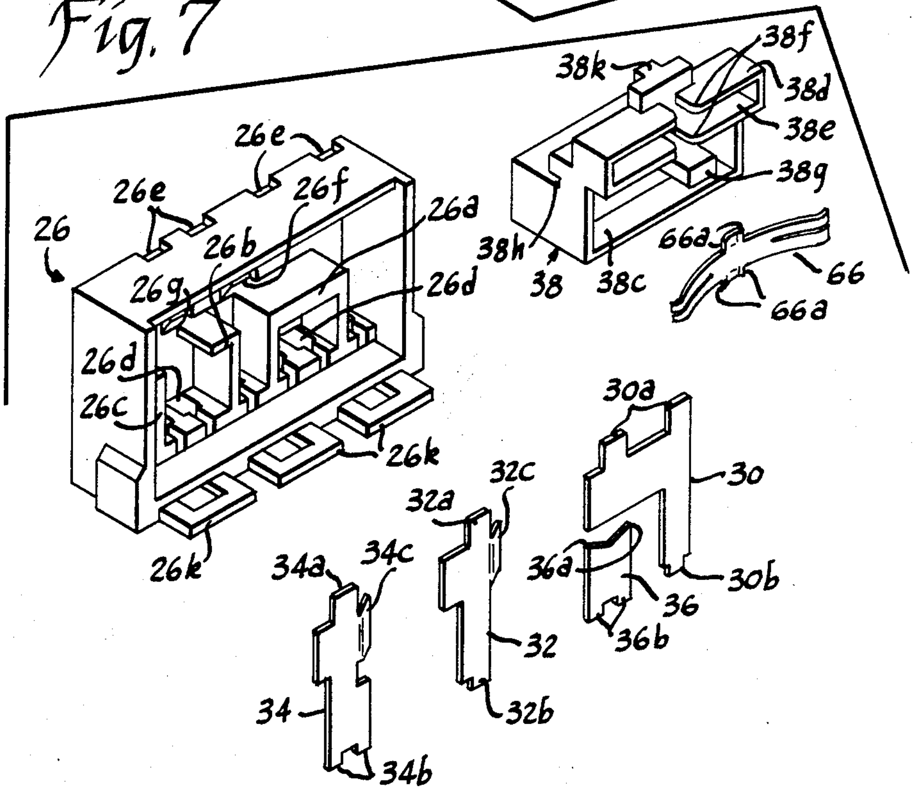
FIG. 7 is an exploded isometric view of a left base half, stationary contacts, movable contact carrier and variable resistor wiper of the switch of this invention.
Figure 12:
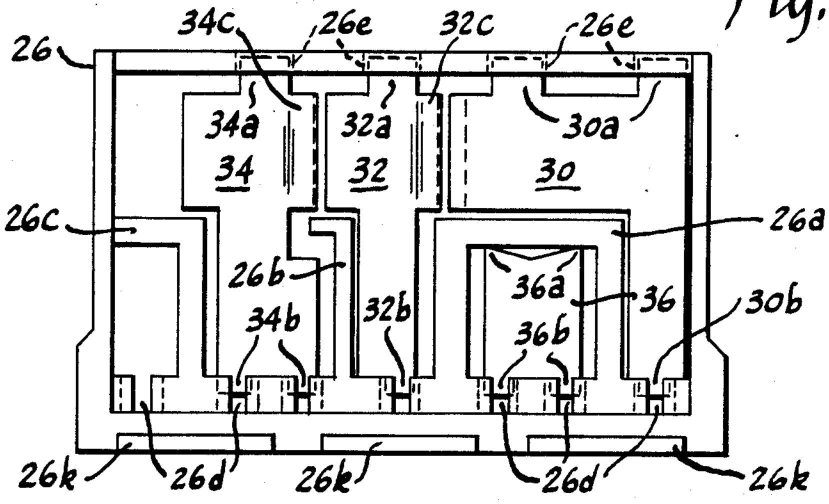
FIG. 12 is an elevational view of the left base half showing the stationary contacts and bussing members positioned therein.

The electrical switching and circuit components for the trigger operated portable electric tool switch of this invention are housed within and between a pair of electrically insulating base halves 26 and 28. Referring specifically to FIGS. 7 and 12, the left base half 26 may be seen to comprise essentially a rectangular box having one side open. The interior of base half 26 is configured to receive and retain stationary contacts 30, 32 and 34 and a bussing connector 36 therein. To this end, a plurality of insulating barriers 26*a*, 26*b* and 26*c* are formed in the interior of base half 26, each being contiguous with the internal surface of the closed side wall and with the bottom wall of the base half. Barrier 26*a* has an inverted U-shaped form while the barriers 26*b* and 26*c* have inverted L-shaped forms. The horizontal leg of barrier 26*c* is also contiguous with an end wall of base half 26 as seen best in FIG. 12. The horizontal portions of each of the barriers 26a, 26b and 26c lie in a common horizontal plane to provide a supporting function for a movable contact carrier 38 as will be described more fully hereinafter. The barriers 26a–c extend approximately halfway toward the open side of base half 26. The bottom wall of base half 26 is stepped upwardly at the vertical plane of the barriers 26a–c and within the area of the barriers is provided with seven rectangular keyhole shaped openings 26d which extend through the bottom wall to the exterior of the base half 26. The upper wall of base half 26 is provided with four openings 26e which communicate with the interior of the base half adjacent the closed side wall thereof.

Stationary contact 30 is essentially an inverted L-shaped member formed of electrically conductive material such as copper or brass. A pair of upwardly projecting tabs 30a are formed along the upper horizontal edge of the contact and a depending tab 30b is provided at the lower end of the vertical leg of the contact. Stationary contact 30 is assembled within left base half 26 by inserting the tabs 30a upwardly through the right-handmost pair of slots 26e until the upper edge of the horizontal leg of contact 30 abuts the interior of the upper wall of base half 26. In this position, the lower end of the contact 30 may be swung into position flush against the interior surface of the closed side wall and may thereafter be slid downwardly along that wall to permit depending tab 30b to project into the wider portion of the respective keyhole opening 26d until the portions of the lower end of the vertical leg of that contact come to rest upon the horizontal surfaces of the bottom wall adjacent either side of the respective keyhole opening. The downward movement of contact 30 to its final position is insufficient to withdraw the tabs 30a from the openings 26e in the upper wall, and the latter thereby retain the upper end of stationary contact 30 firmly against the side wall of base half 26. In a similar manner, stationary contact 32 is provided with a projecting tab 32a along its upper surface and a depending tab 32b at the lower end of its vertical leg. Stationary contact 32 is essentially T-shaped and is assembled in the space between the left-hand end of barrier 26a and the adjacent barrier 26b by inserting the tab 32a through the respectively aligned upper opening 26e, swinging the lower end thereof into position against the interior surface of the side wall and thereafter permitting the contact 32 to slide downwardly along the side wall with the tab 32b entering into the wider portion of the respective keyhole opening 26d until the lower edge of contact 32 abuts the interior surface of the bottom wall of base half 26. The right-hand horizontal leg 32c of the crossbar of T-shaped stationary contact 32 is offset angularly toward the side wall of base half 26, and the internal surface of the latter is recessed at 26f (FIG. 7) to receive the leg 32c therein. The stationary contact 34 is also an essentially T-shaped member having an upper tab 34a and an angularly offset right-hand leg 34c of the crossbar portion of the contact. However, the vertical leg of the contact is widened adjacent the lower end thereof and has a pair of depending tabs 34b formed at the lower end. The interior surface of the side wall of housing 26 is recessed at 26g to receive the offset leg 34c. Contact 34 is assembled into the space between barrier 26b and barrier 26c by inserting tab 34a through the respective aligned opening 26e in the upper wall of base half 26, swinging the lower end of the contact into position flush against the interior surface of the side wall and lowering the contact such that the depending tabs 34b extend into respective adjacent keyhole openings 26d, until the lower end of stationary contact 34 between the tabs 34b comes to rest upon the surface of the bottom wall of base half 26 which is disposed between the adjacent pair of keyhole shaped openings 26d. Bussing connector 36 is assembled within the opening defined by U-shaped barrier 26a. The upper edge of connector 36 is provided with a shallow V-shaped recess to define a pair of points 36a at the opposite vertical edges of the connector. The lower edge of connector 36 is provided with a pair of depending tabs 36b. Connector 36 is assembled in a reverse manner to the stationary contacts 30, 32 and 34 inasmuch as the tabs 36b are first inserted into the wide portions of adjacent keyhole openings within the barrier 26a and the upper end of connector 36 is then pivotally forced to a position flush against the interior surface of the side wall whereupon the points 36a dig into the underside of barrier 26a to retain the connector 36 in that position.

Figure 6:
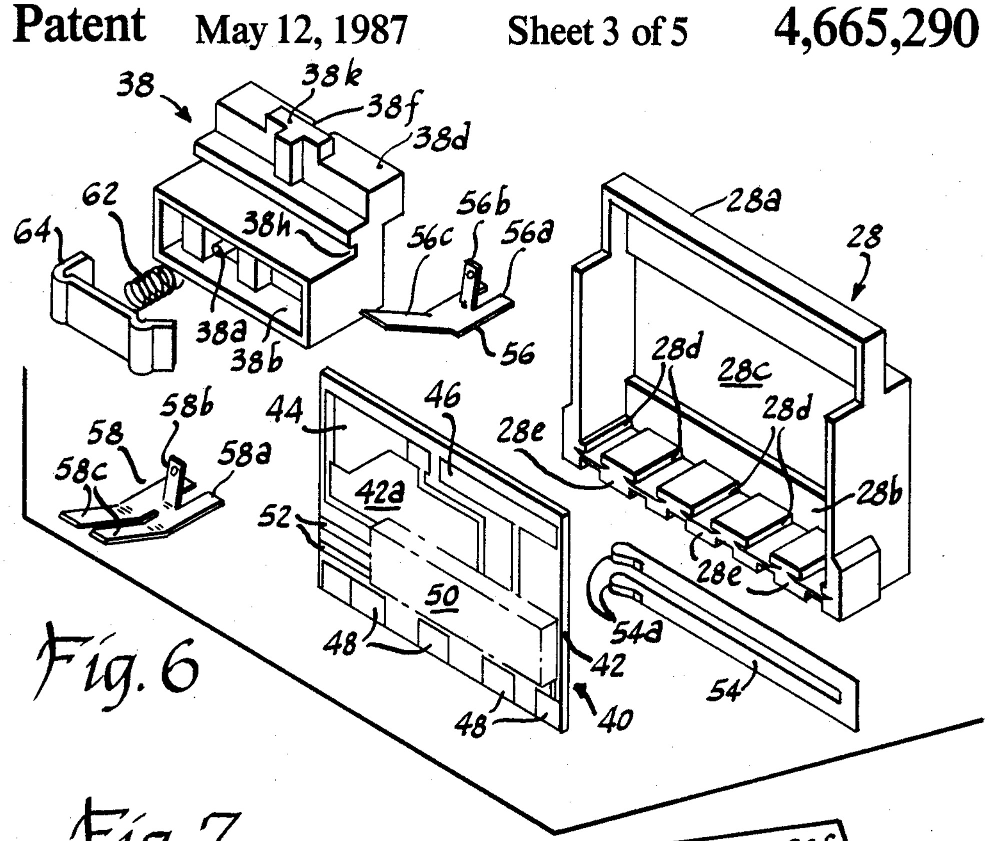
FIG. 6 is an exploded isometric view of a right base half, speed control circuit board, resistor, electrical connectors, contact carrier and movable contactor of the switch of this invention.

Right base half 28 is also essentially a hollow rectangular box with one side open, although the upper wall of this base half is provided with an upwardly offset portion 28a as best seen in FIG. 6. The interior of the side wall of offset portion 28a and a narrow strip 28b adjacent the bottom wall are disposed in a common vertical plane and define a shallow recess 28c therebetween. The bottom wall of the base half 28 has five slots 28d formed therein which extend from the closed side wall to the open side of the base half and are open to the interior of the base half. The lower edges of slots 28d are undercut and extend deeper into the closed side wall.

A speed control hybrid circuit board 40 comprises a substrate such as ceramic or the like 42 on which is printed and mounted various components of a speed control circuit. A resistance strip 44 and a collector strip 46 of a variable resistor assembly are formed along the upper edge of the speed control circuit board 40. Along the lower edge of that board, four electrical connection pads 48 are formed. Other elements of the speed control circuit form no part of this invention and are represented by a dot-dash line rectangle 50 shown immediately above the connection pads 48. Printed circuit conductors extend from the resistance strip 44, collector strip 46, and connection pads 48 to the elements of rectangle 50. A pair of printed conductors 52 also extend to the left-hand edge of speed control circuit board 40 to be engaged by formed-over clip ends 54a of a strip resistor 54 when the latter is clipped over the left-hand edge of circuit board 40. Resistor 54 is a feedback sensing resistor for the speed control circuit and is mounted externally of the substrate 42 to enhance heat dissipation. When the ends 54a are clipped over the circuit board 40 in contact with conductors 52, the main body of the resistor 54 lies along the rear surface of substrate 42 within the cavity 28c.

Figure 8:
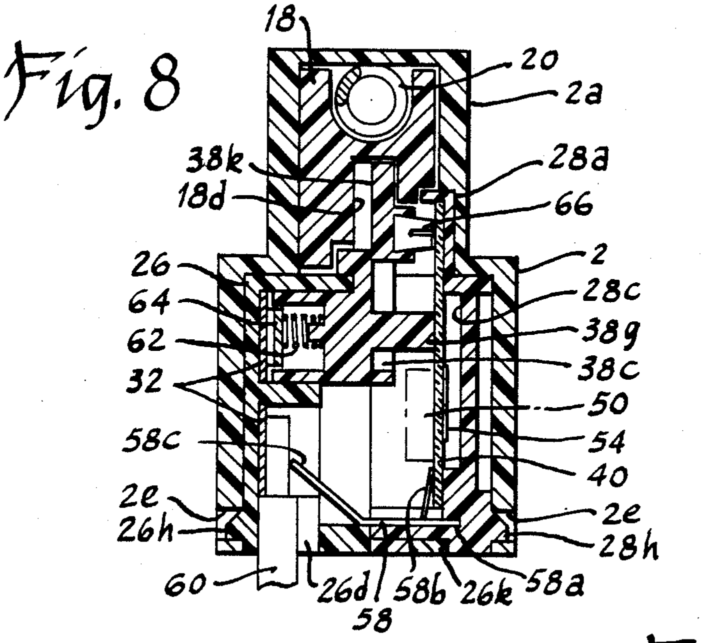
FIG. 8 is a transverse cross-sectional view of the switch of this invention taken along the line 8—8 in FIG. 2.

When speed control circuit board 40 is assembled within right-hand base half 28, the connection pads 48 are disposed in alignment with four of the slots 28d. Electrical connectors 56 and 58 are then assembled to the right base half 28 by forceably inserting the main body portions 56a and 58a into the undercut portions of slots 28d. Each electrical connector 56 and 58 has a tongue 56b and 58b, respectively, sheared from the main body portion 56a and 58a respectively and formed upwardly of the main body portion. The tongues 56b and 58b project upwardly through the respective slots 28d and bear against a respective connection pad 48 of speed control circuit board 40. Each of the electrical connectors 56 and 58 is provided with an oblique leg 56*c* and 58*c*, the leg 58*c* being bifurcated. When the two base halves are assembled, the oblique leg 56*c* or 58*c* extend into the left base half toward the closed side wall thereof and overlie the openings 26*d*. Electrical connector 56 having a single or solid oblique leg 56*c* is disposed in the central and two outermost slots 28*d* of base half 28 while electrical connector 58 is disposed in the two slots which are between the center and respective outer slots. Thus when assembled, the individual segments of bifurcated leg 58*c* individually lie over the respective openings 26*d* within barrier 26*a* and over the two openings 26*d* which are disposed between barriers 26*b* and 26*c*, while the single leg 56*c* of outer connectors 56 extend over the respective openings 26*d* which are formed between the respective end walls of base half 26 and the respective adjacent barriers 26*a* and 26*c* and the leg 56*c* of the centrally disposed connector 56 extends over opening 26*d* which is disposed between barriers 26*a* and 26*b*. With additional reference to FIG. 8, it is to be appreciated that when the base halves are assembled the oblique legs 56*c* and 58*c* extend to a point near the side wall of base half 26 and rest upon the leading edge of the stepped bottom surface of base half 26. Push-in electrical connections to the switch contacts and to the speed control circuit may be made by inserting electrical conductors such as 60 upwardly through the openings 26*d* in the bottom of base half 26. The bared end of the electrical conductors 60 deflects the respective oblique leg 56*c* or 58*c* as it is inserted, whereupon the respective leg 56*c* or 58*c* bears against the edge of the conductor to force it into engagement with respective stationary contact or bus member 30–36 or directly against the side wall of base half 26 as in the opening located within barrier 26*c* and the respective left-hand end wall of base half 26 as viewed in FIGS. 7 and 12. The oblique legs 56*c* and 58*c* bite into the surface of the respective conductors 60 to prevent unintentional withdrawal of the conductor. However, when it is intended to remove a conductor, a thin tool may be inserted into the narrow portion of the keyhole openings 26*d* from the bottom to bear against the underside of the respective oblique leg 56*c* or 58*c* to force the end thereof upwardly, thereby releasing the conductor 60.

Figure 9:
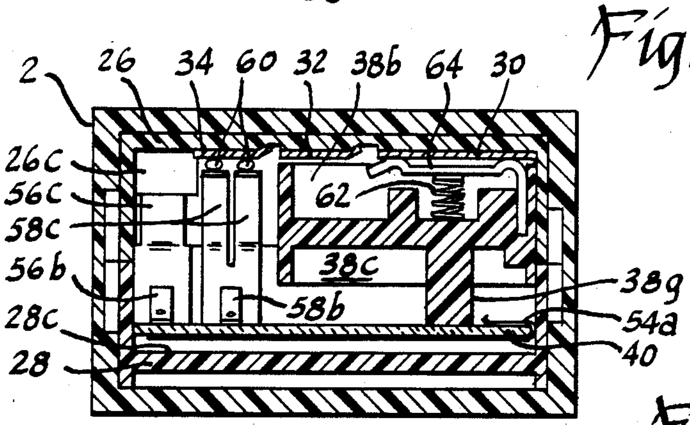
FIG. 9 is a longitudinal cross-sectional view of the switch of this invention taken along the line 9—9 in FIG. 2.

Prior to assembling the two base halves 26 and 28 together, a spring 62 and a movable contactor 64 are assembled to the contact carrier 38 as seen best in FIG. 6. The spring 62 is pressed over a boss 38*a* located within a rectangular cavity 38*b* of contact carrier 38. The contactor 64 is an L-shaped member, the shorter leg of which projects within a slotted portion of the cavity 38*b* as seen in FIG. 9 to interlock the contactor 64 for linear movement with the carrier 38. Referring to FIG. 7 wherein the opposite side of contact carrier 38 is shown, a second rectangular cavity 38*c* is formed in the body portion substantially opposite rectangular cavity 38*b*. A superstructure 38*d* projects upwardly from the main body of the contact carrier and is offset to the right-hand side directly over cavity 38*c*. A third rectangular cavity 38*e* is formed within superstructure 38*d* and the upper and lower walls of the superstructure are provided with a central slot 38*f*. A resilient wiper 66 is mounted in the cavity 38*e*. Wiper 66 comprises an arcuately shaped member having bifurcated opposite ends for engagement with the resistance element 44 and the collector 46 of speed control circuit board 40 when the two base halves and contact carrier are assembled together. Wiper 66 has upwardly and downwardly projecting tabs formed intermediate the ends thereof, each of the tabs having obliquely formed ears 66*a* along their opposite edges. The central portion of the wiper is inserted in the cavity 38*e* such that the tabs are disposed within the slots 38*f*. When so inserted, the ears 66*a* are compressed by the edges of the slot 38*f* to retain the wiper 66 assembled within the cavity. The opposite ends of the wiper project outwardly of the cavity as best seen in FIG. 10. Contact carrier 38 also has a stabilizing pad 38*g* formed within the rectangular cavity 38*c* and projecting outwardly therefrom. Pad 38*g* engages an area 42*a* on substrate 42 to maintain the carrier properly aligned with the face of the speed control circuit board 40 during operation. The superstructure 38*d* and the main body of contact carrier 38 define a narrow groove 38*h* which extends from end to end of the contact carrier. The contact carrier 38 with contactor 64 and wiper 66 assembled thereto is slidably positioned in left base half 26 such that the edge of the upper wall of base half 26 is slidably received within the groove 38*h*. The right base half 28 with speed control circuit board 40 and electrical connectors 56 and 58 assembled thereto is then positioned adjacent the base half 26 such that the pad 38*g* engages the substrate 42 in the area 42*a*. When so assembled, the contact carrier 38 may slide freely from end to end between the two base halves, carrying the contactor 64 into bridging engagement with the respective stationary contacts 30, 32 and 34 and sliding the wiper 66 along the resistance strip 44 and collector strip 46.

The bias of contactor 64 into engagement with the respective stationary contacts 30–34 by spring 62 and the bias of the wiper 66 when engaging the strips 44 and 46 on the substrate 42 react in opposite directions tending to separate the two base halves. Moreover, the bias of electrical connectors 56 and 58 against the connection pads 48 of speed control circuit board 40 and the bias provided by oblique legs 56*c* and 58*c* when engaging conductors such as 60 after final assembly also provide oppositely directed forces tending to separate the base halves 26 and 28 along the lower edge. The base halves are intended to be retained in their assembled position by inserting the subassembled base halves and contact carrier into the switch frame 2 from the open bottom end thereof. Switch frame 2 is preferably molded of an insulating material whereby the side walls of the lower portion of the frame 2 are somewhat flexible. The side walls have opposed openings 2*e* adjacent the lower edge thereof which cooperate with bosses 26*h* and 28*h* formed on the respective base halves. Upon insertion of the subassembly, the bosses 26*h* and 28*h* cam the lower ends of the side walls of frame 2 outwardly until the bosses 26*h* and 28*h* become aligned with the openings 2*e*, whereupon the side walls snap over the bosses 26*h* and 28*h* to retain the subassembled base halves within the frame 2. To aid the resilient lower portions of the side walls of frame 2 in maintaining the lower portions of the base halves firmly assembled together against the oppositely directed biases, the left base half 26 is provided with a plurality of U-shaped eyelet formations 26*k* which project outwardly from the open side of that base half along the bottom edge thereof. The bottom surface of right base half 28 is provided with a plurality of U-shaped recesses which define hook portions 28*e* over which the U-shaped eyelets 26*k* are disposed to securely interlock the lower edges of the two base halves together, thereby resisting separation by the forces applied by the connector members 56 and 58 and the biases of the contactor 64 and wiper 66.

The superstructure 38*d* of contact carrier 38 is provided with a vertically directed T-shaped projection 38*k*. This projection is received within a recess 18*d* in the underside of trigger body 18 upon insertion of the subassembled base halves and contact carrier to the base 2 to provide a driving connection between trigger body 18 and contact carrier 38. Depression of trigger operator 4 thereby slides carrier 38 along the base halves 26 and 28. Initial depression of trigger operator 4 moves contactor 64 into bridging engagement with stationary contacts 30 and 32 to connect power to the speed control circuit of circuit board 40. Further depression of trigger operator 4 moves the wiper 66 along the resistor strip 44 and collector 46 to change the resistance in the speed control circuit, thereby increasing the motor speed as the trigger operator is more deeply depressed. Full depression of trigger operator 4 carries contactor 64 into bridging engagement with stationary contacts 30 and 34 for applying full supply voltage to the motor in shunt of the speed control circuit.

What is claimed is:

1. A trigger operated switch comprising, in combination:

a hollow insulating housing open to a bottom side thereof and having an opening in one end wall;

a trigger operator mounted for reciprocal movement in said housing having a portion extending through said opening in said end wall;

a subassembly arranged for insertion into said housing through said open bottom side comprising:

a pair of box-shaped base halves each having an open side positioned together with said open sides in juxtaposition and defining an opening in respective upper walls along the juncture of said base halves;

a first one of said base halves having a plurality of discrete stationary contact members disposed vertically against an internal surface of a side wall opposite said open side;

a second one of said base halves having a speed control circuit board mounted vertically therein, said circuit board comprising variable resistor resistance and collector strips and electrical connection contact pads on a common surface thereof, said common surface being disposed in opposed facing relationship to said stationary contact members;

an insulating contact carrier within said base halves between said stationary contact members and said speed control circuit board for sliding movement parallel to the juncture of said base halves, said carrier having mechanical connection means projecting beyond said base halves through said upper wall opening engageable with said trigger operator upon insertion of said subassembly into said housing, a movable contact carried by said carrier on one side thereof spring biased outwardly of said carrier into engagement with said stationary contacts and a variable resistor wiper carried on an opposite side of said carrier biased into engagement with said resistance and collector strips, said bias of said movable contact and said wiper being in opposite directions transverse to the juncture of said base halves tending to separate said base halves; and means on said first base half interengaging with cooperable means on said second base half for securely interlocking lower portions of said base halves together against said bias, said base halves being held together at upper portions thereof by said housing when said subassembly is inserted therein.

2. The invention defined in claim 1 wherein said subassembly further comprises resilient electrical connectors which bear outwardly in opposite directions transverse to the juncture of said base halves against respective ones of said stationary contact members and said electrical connection contact pads for effecting spring biased electrical connections between said stationary contact members and said circuit board, said spring biased connections tending to separate said base halves.

3. The invention defined in claim 2 wherein said electrical connectors are mounted in said second base half along a lower portion thereof, each said connector comprising a first resilient leg biased against a respective contact pad, and a second resilient leg extending into said first base half biased into engagement with a respective stationary contact member.

4. The invention defined in claim 3 wherein said second resilient leg is disposed at an angle to said stationary contact member directed away from a bottom surface of said first base half toward said stationary contact member, said bottom surface having apertures aligned with said stationary contacts members for receiving wire conductors insertable therein, said second leg and said stationary contact member cooperating to effect a push-in electrical connector wherein said wire conductor is gripped by said second leg and retained thereby against said stationary contact member.

5. A trigger operated switch comprising, in combination:

a hollow insulating housing open to a bottom side thereof and having an opening in one end wall;

a trigger operator mounted for reciprocal movement in said housing having a portion extending through said opening in said end wall;

a subassembly arranged for insertion into said housing through said open bottom side comprising:

a first base half having a plurality of stationary contacts disposed along an internal side surface;

a second base half having a speed control circuit board mounted therein, said circuit board comprising variable resistor resistance and collector strips and electrical connection contact pads on a common surface thereof;

a contact carrier disposed between said base halves for sliding movement, said carrier having mechanical connection means engageable with said trigger operator upon insertion of said subassembly into said housing, a movable contact on one side of said carrier spring biased into engagement with said stationary contacts and a variable resistor wiper on an opposite side of said carrier biased into engagement with said resistance and collector strips, said bias of said movable contact and said wiper being in opposite directions tending to separate said base halves;

means on said first base half interengaging with cooperable means on said second base half for securely interlocking lower portions of said base halves together against said bias, said base halves being held together at upper portions thereof by said housing when said subassembly is inserted therein; and wherein said stationary contacts comprise an upstanding tab projecting from an upper edge and said first base half comprises openings in an upper surface at each contact location adjacent said internal side surface and structural abutments spaced away from said internal side surface at each contact opening adjacent a lower surface of said first base half, said tab being received in a respective one of said upper surface openings when a lower end of said contact is positioned between said internal side surface and a respective one of said abutments for retaining said stationary contact assembled to said first base half.

6. The invention defined in claim 5 wherein said tab projects a predetermined distance above said upper edge of said stationary contact for permitting said tab to be inserted in said upper surface opening and said stationary contact to be raised within said first base half an amount sufficient to permit said lower end of said contact to clear a respective abutment for positioning against said internal side surface and subsequently to be lowered to a position wherein said lower end of said stationary contact becomes positioned between said internal side surface and said abutment then said tab is received in said upper surface opening.

7. A trigger operated switch comprising, in combination:

a hollow insulating housing open to a bottom side thereof and having an opening in one end wall;

a trigger operator mounted for reciprocal movement in said housing having a portion extending through said opening in said end wall;

a subassembly arranged for insertion into said housing through said open bottom side comprising:

a first base half having a plurality of stationary contacts disposed along an internal side surface;

a second base half having a speed control circuit board mounted therein, said circuit board comprising variable resistor resistance and collector strips and electrical connection contact pads on a common surface thereof;

a contact carrier disposed between said base halves for sliding movement, said carrier having mechanical connection means engagable with said trigger operator upon insertion of said subassembly into said housing, a movable contact on one side of said carrier spring biased into engagement with said stationary contacts and a variable resistor wiper on an opposite side of said carrier biased into engagement with said resistance and collector strips, said bias of said movable contact and said wiper being in opposite directions tending to separate said base halves;

means on said first base half interengaging with cooperable means on said second base half for securing interlocking lower portions of said base halves together against said bias, said base halves being held together at upper portions thereof by said housing when said subassembly is inserted therein; and further comprising a resistance element formed in a strip having its ends formed over on themselves to form resilient clips, and said circuit board having conductive portions along one edge thereof electrically connected to circuit elements of said board, said resistance element being attached to said board engaging said clips over said one edge of said board in electrical connection with said conductive portions, said resistance element extending along a back surface of said board for enhanced heat dissipation.

* * * * *